United States Patent
Otosaka et al.

(10) Patent No.: US 9,422,185 B2
(45) Date of Patent: Aug. 23, 2016

(54) APPARATUS FOR SINTERING A GLASS PREFORM FOR AN OPTICAL FIBER AND SINTERING METHOD THEREOF

(71) Applicant: SHIN-ETSU CHEMICAL CO., LTD., Tokyo (JP)

(72) Inventors: Tetsuya Otosaka, Annaka (JP); Kazuya Uchida, Tsukuba (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 91 days.

(21) Appl. No.: 14/276,263

(22) Filed: May 13, 2014

(65) Prior Publication Data

US 2014/0345332 A1    Nov. 27, 2014

(30) Foreign Application Priority Data

May 21, 2013   (JP) ................. 2013-106731

(51) Int. Cl.
*C03B 37/029*   (2006.01)
*C03B 37/014*   (2006.01)

(52) U.S. Cl.
CPC ............. *C03B 37/0146* (2013.01); *Y02P 40/57* (2015.11)

(58) Field of Classification Search
CPC ................................. C03B 37/0146
See application file for complete search history.

(56) References Cited

FOREIGN PATENT DOCUMENTS

| | | |
|---|---|---|
| JP | A-63-159232 | 7/1988 |
| JP | A-2002-226218 | 8/2002 |
| JP | A-2008-105904 | 5/2008 |
| JP | A-2008-179517 | 8/2008 |
| JP | A-2009-120451 | 6/2009 |
| JP | A-2009-292658 | 12/2009 |
| JP | B2-4737031 | 7/2011 |

OTHER PUBLICATIONS

Extended European Search Report issued in European Patent Application No. 14167633.8 dated Jul. 15, 2014.

*Primary Examiner* — Jodi C Franklin
(74) *Attorney, Agent, or Firm* — Oliff PLC

(57) ABSTRACT

The present invention provides an apparatus for sintering a glass preform for an optical fiber, wherein the glass preform for the optical fiber is received in a muffle tube and is heated in an atmospheric gas while being suspended on a shaft and supported thereon, the apparatus comprising: a first gas seal that is provided at an upper end of the muffle tube, the shaft being inserted therethrough; a buffering chamber that is provided above the first gas seal and that covers the shaft; a second gas seal that is provided at an upper end of the buffering chamber, the shaft being inserted therethrough; and a unit that introduces the atmospheric gas exhausted from the muffle tube into the buffering chamber.

14 Claims, 2 Drawing Sheets

APPARATUS FOR SINTERING A GLASS PREFORM FOR AN OPTICAL FIBER AND SINTERING METHOD THEREOF

CROSS-REFERENCE TO RELATED APPLICATION

This non-provisional application claims priority under 35 U.S.C. §119(a) from Japanese Patent Application No. 2013-106731, filed on May 21, 2013, the entire contents of which are incorporated herein by reference.

BACKGROUND OF THE INVENTION

1. Field of the Invention

The present invention relates to an apparatus for sintering a glass preform for an optical fiber and to a method thereof for preventing a leakage of gas within a muffle tube as well as an entry of external air into the muffle tube, and for extending the service life of the muffle tube so as to reduce cost.

2. Description of the Related Art

The processes referred to as a VAD (vapor-phase axial deposition) process and an OVD (outside vapor deposition) process are known as being processes for manufacturing a glass preform for an optical fiber. In these processes, first, a glass raw material is burnt in flames to generate glass particles and such particles are deposited on a rotating target rod either axially or radially, and then a porous glass preform is produced.

The porous glass preform produced in this way is heated to 1400-1600° C. in an atmosphere wherein the major component thereof is helium and wherein dehydration gas, such as chlorine for reducing OH groups in glass, and oxygen for reducing binding defects in glass, are added as needed. The reason why helium is used is because it has high thermal conductivity and also because it has a high solubility into glass and thus, bubbles are unlikely to remain in the glass. Prior to transparent vitrification, a dehydration process may be performed at the temperature of 1000-1250° C. The porous glass preform is heated to 1400-1600° C. and becomes a transparent glass preform.

The heating of the porous glass preform is carried out in a vessel made of quartz glass, which is referred to as a muffle tube, in an apparatus referred to as a sintering furnace. A heating furnace is arranged around the central part of the muffle tube. At the upper end portion of the muffle tube, a shaft is passed therethrough in order to suspend the porous glass preform. The porous glass preform is heated sequentially from its end portion by passing, in a rotating manner, the heating zone in an upward direction or a downward direction.

While the glass preform is heated at the central part of the muffle tube, convection tends to occur inside the muffle tube since space exists at the upper portion or lower portion of the glass preform, and thus, the internal pressure in the muffle tube fluctuates.

Since the shaft passes through the pass-through portion at the upper end of the muffle tube in a rotational and vertical manner, a complete gas-tight sealing is difficult, and when the internal pressure in the muffle tube becomes negative, the external air will be sucked into the muffle tube through the pass-through portion. When the external air is sucked into the muffle tube, the moisture in the external air will also be taken therein and thus, the concentration of OH groups in the glass will be increased, which leads to a degradation of the transmission properties of the optical fiber. In addition, nitrogen gas, which has a larger molecular mass than that of helium, will be taken therein and thus, bubbles tend to remain in the glass, which leads to a decrease in product yield.

In contrast, when the internal pressure in the muffle tube becomes positive, chlorine, which is a component of the atmospheric gas in the muffle tube, will be released into the external air. Since chlorine is a toxic and corrosive gas, it is unpreferable for work environments. Chlorine will further shorten the service life of the apparatus by oxidizing the same and the oxidization of the apparatus will lead to dust arising, which leads to a degradation of the product's properties and a decrease in product yield.

Moreover, when the pressure difference between outside and inside of the muffle tube becomes large, the muffle tube made of quartz glass will shrink or expand due to such pressure difference. When the muffle tube shrinks, the maximum external diameter of the porous glass preform processable in the muffle tube will be decreased. Further, when the muffle tube expands and sticks to the heating furnace, the service life of the muffle tube will be reduced.

In order to solve the problems above, in Patent Document 1, three chambers, respectively referred to as a pressure adjustment gas introduction part, an exhaust chamber and a sealing chamber, are provided at the upper lid portion; a flow rate of the supplied atmospheric gas is controlled in accordance with pressure fluctuations in the muffle tube; a flow rate of helium, which is supplied as pressure adjustment gas, is controlled in accordance with pressure fluctuations in the exhaust chamber; and nitrogen is supplied to the sealing chamber as sealing gas.

PRIOR ART REFERENCES

Patent Documents

Patent Document 1: JP4737031B

SUMMARY OF THE INVENTION

By the method described in Patent Document 1, it is possible to prevent, while suppressing pressure fluctuations in a muffle tube, the release of gas from the muffle tube into the atmosphere and the entry of external air into the muffle tube. However, a gas flow rate needs to be controlled while constantly monitoring the internal pressures in the muffle tube and the exhaust chamber using a pressure gauge. For this reason, the cost for producing apparatuses will be high, and the running costs will be also high since expensive helium is used as the pressure adjustment gas. Furthermore, since the muffle tube contains a corrosive atmosphere composed of chlorine, etc. to be used as dehydrating gas, the pressure gauge's service life is short under this method in which constant pressure monitoring is required.

In addition, there is a method in which both the introduction flow rate and the exhaust flow rate of atmospheric gas for suppressing pressure fluctuations. However, in this case as well, a great amount of expensive helium is needed and thus, the running costs will be high.

In order to solve the problems above, in the apparatus for sintering a glass preform for an optical fiber according to the present invention, the glass preform for the optical fiber is received in a muffle tube and heated in an atmospheric gas while being suspended on a shaft and supported thereon. The apparatus includes a first gas seal, through which the shaft is inserted, provided at an upper end of the muffle tube; a buffering chamber that is provided above the first gas seal and that covers the shaft; a second gas seal, through which shaft is inserted, provided at an upper end of the buffering chamber;

and a unit that introduces the atmospheric gas exhausted from the muffle tube into the buffering chamber.

Due to the presence of the first gas seal, the propagation of internal pressure fluctuations in the muffle tube to the buffering chamber is relaxed, and moreover, the entry of the external air components into the muffle tube via the first gas seal is prevented, in case of the internal pressure of the muffle tube becomes negative.

By introducing the atmospheric gas exhausted from the muffle tube into the buffering chamber, the gas components in the buffering chamber become close to those of the atmospheric gas in the muffle tube and thus, the entry of the external air components into the muffle tube via the first gas seal can be reduced, in case of the internal pressure in the muffle tube becomes negative.

Due to the presence of the second gas seal, the leakage of the atmospheric gas components in the muffle tube introduced into the buffering chamber to the exterior is suppressed.

Preferably, the atmospheric gas is exhausted from the muffle tube, via the atmospheric gas exhaust pump, so that the atmospheric gas is introduced into the buffering chamber. As a consequence, the atmospheric gas exhausted from the muffle tube is efficiently introduced into the buffering chamber, In addition, by adjusting the flow rate of the atmospheric gas exhausted from the muffle tube, via the output of the exhaust pump and a valve provided to the exhaust pump, the internal pressure of the muffle tube can be adjusted.

Preferably, an external air chamber is provided above the second gas seal so as to cover the shaft and to introduce the external air therein. Consequently, the leakage of the atmospheric gas into the external air is significantly reduced.

Preferably, the internal pressure of the buffering chamber is approximately equal to the external air pressure. When the internal pressure of the buffering chamber is too high, the amount of the atmospheric gas leaking to the external air increases. In contrast, when the internal pressure of the buffering chamber is too low, the external air enters into the buffering chamber and accordingly, the external air enters to the muffle tube via the first gas seal, in case of the internal pressure of the muffle tube becomes negative.

Preferably, an external air suction port is provided midway along a pipe connecting the buffering chamber exhaust tube and the main exhaust tube. The internal pressure of the buffering chamber can easily adjusted to be approximately equal to the external air pressure without the need for any complicated devices.

Such external air suction port may be provided as a gap at the connection between the main exhaust tube and the pipe. By avoiding a tight connection at the connection with the pipe, while ensuring the capability of exhaust leading to detoxifying equipment, etc., the ability to suck the external air is also provided.

More preferably, a buffering gas retention vessel is provided midway along a pipe connecting the buffering chamber exhaust tube and the external air suction port. Most of the gas components in the buffering gas retention vessel originate from the atmospheric gas in the muffle tube, and thus, the entry of the external air into the muffle tube in case of the external air flows back due to the negative pressure in the muffle tube, is prevented.

Preferably, a convection prevention member is provided in the vicinity of a lower end of the shaft to narrow down the gap between the outer circumference of the shaft and the inner circumference of the muffle tube. Due to the presence of such convection prevention member, the internal pressure fluctuations in the muffle tube are reduced and the possibility that the external air enter to the muffle tube is also reduced.

Preferably, the first gas seal and the second gas seal respectively have a laminated structure of a felt-like sheet and a gas-tight sheet. Preferably, a carbon felt sheet is used for the felt-like sheet and a fluorine resin sheet is used for the gas-tight sheet. Both carbon felt sheet and fluorine resin sheet excel in terms of heat resistance and chlorine resistance and thus, they can extend the service life of the members.

Preferably, the flow rate of the atmospheric gas exhaust pump is adjusted so that to an hourly average pressure in the muffle tube is set within ±200 Pa with respect to the external air pressure. This is because, when the difference between the average pressure in the muffle tube and the external air pressure becomes large, the high-temperature part of the muffle tube will expand or shrink. In particular, when the high-temperature part of the muffle tube expands, the muffle tube and the heating furnace may come into contact with each other and this may reduce service life for the muffle tube.

According to the present invention, even when the internal pressure of the muffle tube temporarily becomes negative, the suction of the external air into the muffle tube can still be prevented and thus, the degradation of the optical fiber preform properties can still be suppressed.

DETAILED DESCRIPTION OF THE EMBODIMENTS

Figure 1:
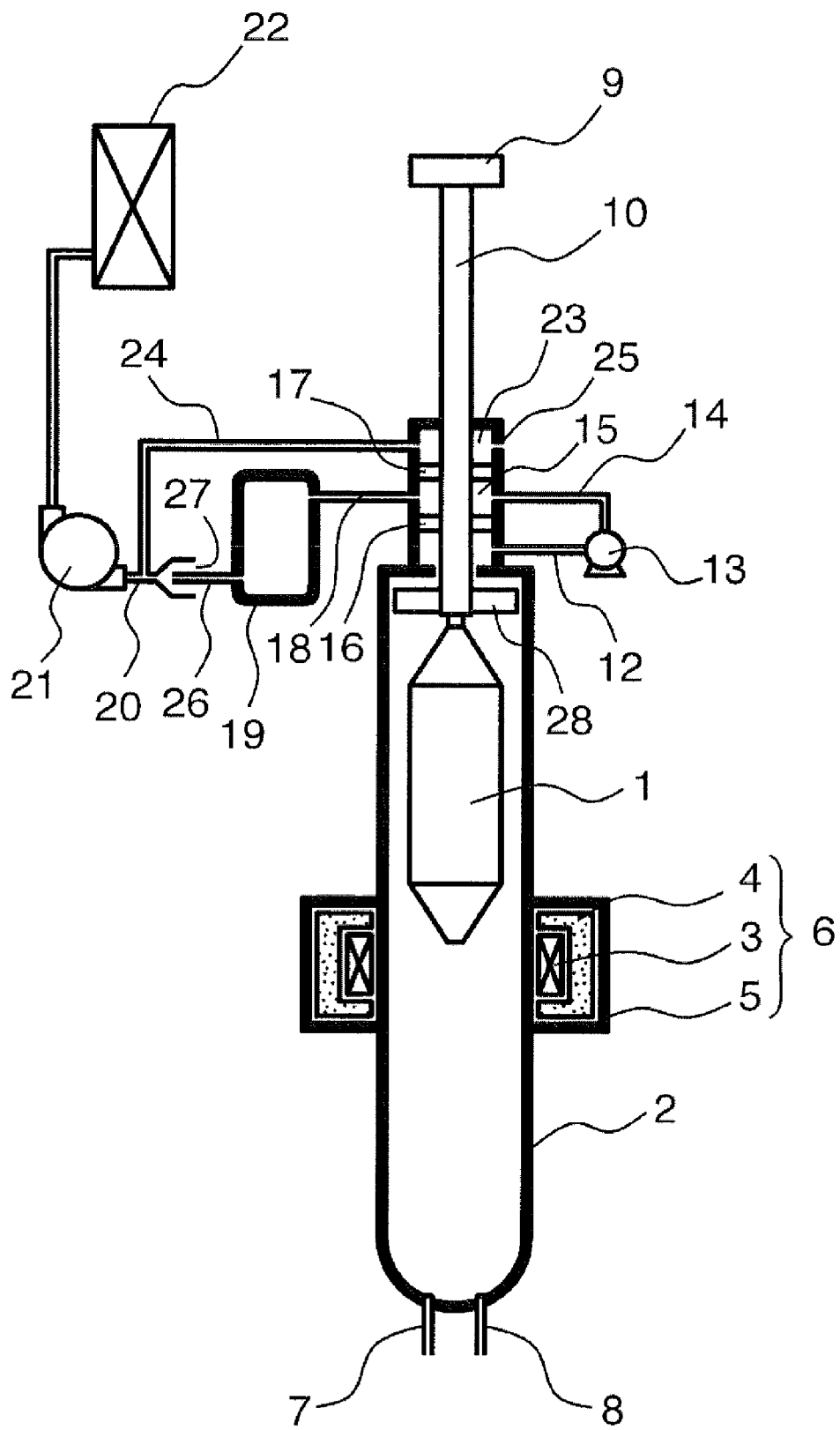
FIG. 1 is a schematic diagram of an embodiment of an apparatus for sintering a glass preform for an optical fiber according to the present invention.

An apparatus for sintering a glass preform for an optical fiber according to the present invention will be described hereinafter, with reference to the drawings. FIG. 1 is a schematic diagram of an apparatus for sintering a glass preform for an optical fiber according to the present invention.

A porous glass preform 1 is received inside a muffle tube 2 made of quartz glass and is heated by a heating furnace 6 configured by a heater 3, a heat-insulating material 4 and a water-cooling chamber 5, etc.

The surroundings of the porous glass preform 1 are filled with atmospheric gas introduced from an atmospheric gas introduction port 7 located at the lower end of the muffle tube 2. The atmospheric gas is a mixed gas composed of helium, chlorine and oxygen, etc. The pressure inside the muffle tube 2 is measured by a pressure gauge connected to a pressure measurement nozzle 8 provided to the muffle tube 2. In order to prevent degradation due to the corrosive chlorine, such pressure gauge may be configured to perform intermittent measurement, in which measurement and pipe purging are repeated, rather than constant measurement.

At the upper portion, an elevating device 9 and a shaft 10 are provided, and the shaft 10 extends into the muffle tube 2 through a first gas seal 16. The porous glass preform 1 is rotated and lowered, via the shaft 10, by the elevating device 9 and is introduced into a heating zone within the heating furnace 6.

At the upper portion of the muffle tube 2, an atmospheric gas exhaust tube 12 and an atmospheric gas exhaust pump 13 are provided, and the atmospheric gas within the muffle tube 2 is exhausted to the outside of the muffle tube 2 by means of such tube and pump. The exhaust from the atmospheric gas exhaust pump 13 is introduced into a buffering chamber 15, which is provided above the first gas seal 16 so as to cover the shaft, via a buffering gas introduction tube 14. A second gas seal 17, through which the shaft passes, is located above the buffering chamber 15. The buffering chamber 15 is loosely separated from the upper and lower spaces by the first gas seal 16 and the second gas seal 17.

The atmospheric gas introduced into the buffering chamber 15 is connected to a main exhaust tube 20, via a buffering chamber exhaust tube 18 and a buffering gas retention vessel 19. The main exhaust tube 20 is connected to detoxifying equipment 22, such as a scrubber or the like, via a main exhaust pump 21. At such detoxifying equipment, hazardous components, such as chlorine, contained in the exhaust are removed.

An external air chamber 23 is provided above the second gas seal 17. The external air chamber 23 is connected to the main exhaust tube 20 via an external air chamber exhaust tube 24. An atmosphere suction port 25 is provided to the external air chamber 23, and the external air chamber 23 is always ventilated with the external air.

The connection between a buffering gas outlet tube 26 extending from the buffering gas retention vessel 19 and the main exhaust tube 20 has a configuration in which the buffering gas outlet tube 26 having a smaller external diameter is inserted into the main exhaust tube 20 having a larger internal diameter with a gap 27 therebetween. Such gap 27 acts as an external air suction port and thus, the external air is sucked into the main exhaust tube 20 along with the exhaust gas.

A convection prevention member 28 is provided in the vicinity of the lower end of the shaft 10 so as to prevent, to a certain degree, convection occurring in case of the volume of the upper space of the muffle tube 2 increases as the sintering process proceeds and the porous glass preform 1 is pulled down. Thereby, the degree of the internal pressure in the muffle tube 2 becoming negative is decreased.

The first and second gas seals 16, 17 exist in order to separate the corresponding upper or lower space; however, since the shaft 10 moves in a rotational and vertical manner, it is difficult to achieve a complete gas-tight sealing.

The atmospheric gas, which is exhausted via the atmospheric gas exhaust tube 12, the atmospheric gas exhaust pump 13 and the buffering gas introduction tube 14, fills the buffering chamber 15 and the buffering gas retention vessel 19, and is then released from a distal end of the buffering gas outlet tube 26. The distal end of the buffering gas outlet tube 26 is inserted inside the main exhaust tube 20 and is loosely connected thereto. Consequently, the internal pressures in the buffering chamber 15 and the buffering gas retention vessel 19 are automatically maintained at near-atmospheric pressure.

When the internal pressure in the muffle tube 2 is changed and becomes negative, the gas inside the buffering chamber 15 enters into the muffle tube 2 via the first gas seal 16. However, since the components of the gas filled in the buffering chamber 15 are approximately the same as those of the atmospheric gas in the muffle tube 2, the properties of the porous glass preform 1 are not affected by such gas. Depending on the degree of the negative pressure and on duration of negative pressure, the entirety of the gas filled in the buffering chamber 15 will be sucked into the muffle tube 12. However, since gas having components approximately the same as those of the atmospheric gas is supplied from the buffering gas retention vessel 19 with a sufficient capacity, the external air will not be mixed into the muffle tube 2.

The external chamber 23 is always ventilated and is always at a negative pressure with respect to the external air pressure. Even when the internal pressure in the muffle tube 2 becomes positive and the internal pressure of the buffering chamber 15 also becomes positive as a consequence thereof, thus causing the exhaust gas to enter the external chamber 23 via the second gas seal 17, such exhaust gas will immediately be exhausted via the external air chamber exhaust tube 24 and thus, the exhaust gas will not leak to the atmosphere.

The first and second gas seals 16, 17 are required to maintain the best sealing properties possible without suppressing the rotational and vertical motion of the shaft 10. Furthermore, materials and structures of the seals are required to resist a high-temperature and chlorine-containing atmosphere. In order to achieve the above, the gas seal preferably has a doughnut-shaped structure in which carbon felt is laminated with a fluorine resin (such as PTFE and PFA, etc.) sheet.

EXAMPLES

Example 1

Transparent vitrification of the porous glass preform was performed by means of the sintering apparatus shown in FIG. 1. The introduction gas amount for He was 10 L/min and for $Cl_2$ it was 2 L/min. The flow rate of the exhaust pump was adjusted in such a manner that the hourly average value of the internal pressure in the muffle tube was kept within ±200 Pa with respect to the external air pressure. The momentary value of the internal pressure in the muffle tube ranged between +1000 Pa and −1000 Pa with respect to the external air pressure. No residual bubbles were observed in the transparent-vitrified glass preform. In addition, no deformation of the muffle tube was observed.

Comparative Example 1

Figure 2:
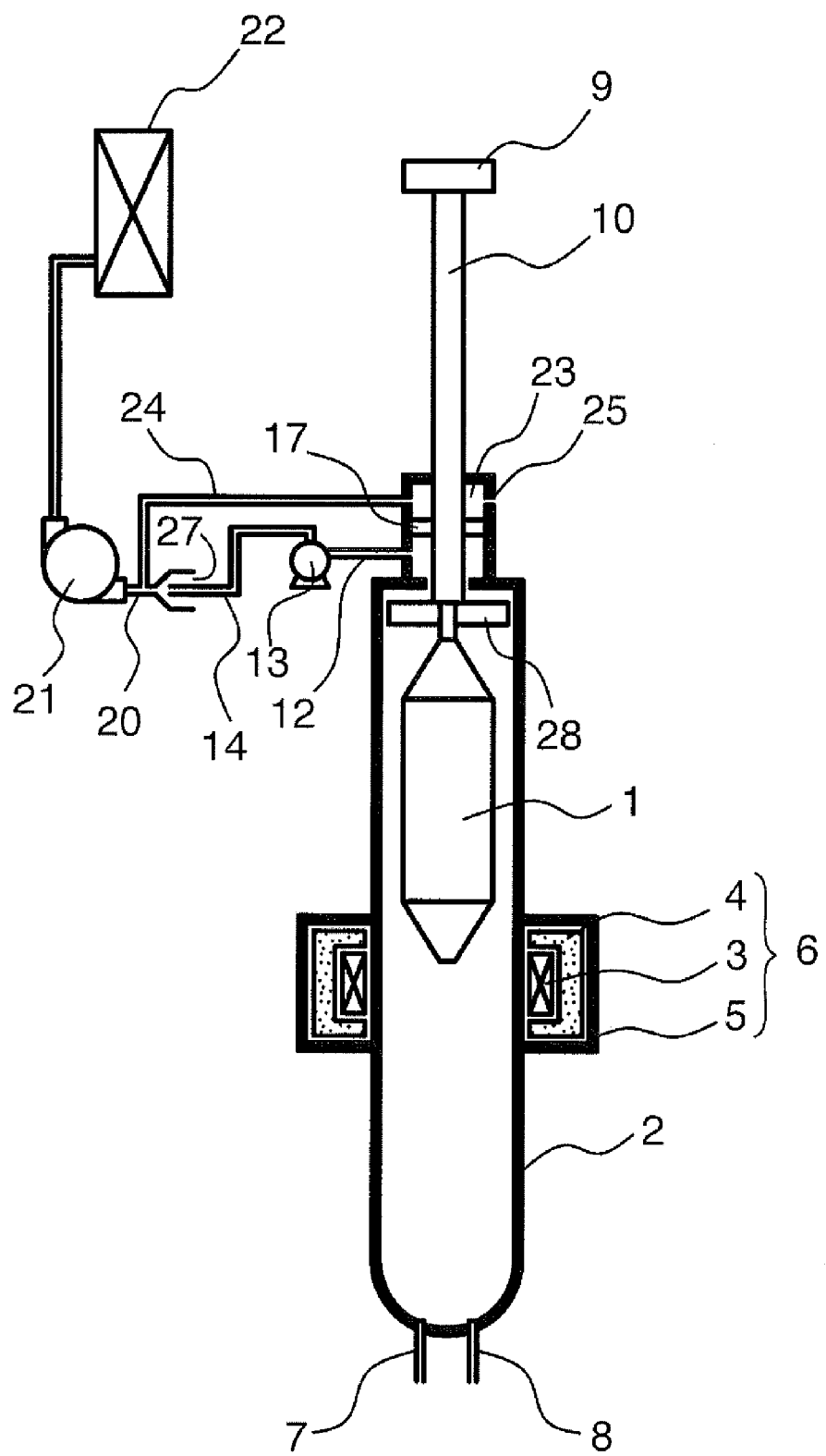
FIG. 2 is a schematic diagram of a conventional apparatus for sintering a glass preform for an optical fiber.

Transparent vitrification of the porous glass preform was performed by means of the sintering apparatus shown in FIG. 2, in which the exhaust gas from the atmospheric gas exhaust pump is directly connected to the main exhaust tube. The reference numerals in FIG. 2 are in common with those in FIG. 1. The introduction gas amount for He was 10 L/min and for $Cl_2$ it was 2 L/min. The flow rate of the exhaust pump was adjusted in such a manner that the hourly average value of the internal pressure in the muffle tube was kept within ±200 Pa with respect to the external air pressure. The momentary value of the internal pressure in the muffle tube ranged between +1000 Pa and −1000 Pa with respect to the external air pressure. No deformation of the muffle tube was observed; however, residual bubbles were observed in the transparent-vitrified glass preform.

Comparative Example 2

Transparent vitrification of the porous glass preform was performed by means of the sintering apparatus shown in FIG. 1. The introduction gas amount for He was 10 L/min and for $Cl_2$ it was 2 L/min. The flow rate of the exhaust pump was adjusted in such a manner that the hourly average value of the internal pressure in the muffle tube was kept within the range between +200 Pa and +600 Pa with respect to the external air pressure. The momentary value of the internal pressure in the muffle tube ranged between −600 Pa and +1400 Pa with respect to the external air pressure. No residual bubbles were observed in the transparent-vitrified glass preform. However, an expansion in the muffle tube was observed.

Comparative Example 3

Transparent vitrification of the porous glass preform was performed by means of the sintering apparatus shown in FIG.

1. The introduction gas amount for He was 10 L/min and for $Cl_2$ it was 2 L/min. The flow rate of the exhaust pump was adjusted in such a manner that the hourly average value of the internal pressure in the muffle tube was kept within the range between −600 Pa and −200 Pa with respect to the external air pressure. The momentary value of the internal pressure in the muffle tube ranged between −1400 Pa and +600 Pa with respect to the external air pressure. No residual bubbles were observed in the transparent-vitrified glass preform; however, an expansion in the muffle tube was observed.

As is clear from the descriptions above, by making use of an apparatus for sintering a glass preform for an optical fiber according to the embodiment, even when the internal pressure of the muffle tube temporarily becomes negative due to internal pressure fluctuations in the muffle tube, the suction of the external air into the muffle tube can still be prevented and thus, the degradation of the properties of the optical fiber preform can still be suppressed.

In addition, by keeping the average pressure in the muffle tube at the same level as that of the external air pressure, the occurrence of an expansion or shrinkage of the muffle tube can be suppressed and thus, the service life of the muffle tube can be extended.

Furthermore, since there is no need to constantly control the gas flow rate or exhaust amount depending on the internal pressure of the muffle tube, the cost for producing apparatuses and the failure rates thereof can both be reduced.

INDUSTRIAL APPLICABILITY

According to the apparatus for sintering a glass preform for an optical fiber and the sintering method thereof of the present invention, even when the internal pressure of the muffle tube temporarily becomes negative due to internal pressure fluctuations in the muffle tube, the degradation of the properties of the optical fiber preform can still be suppressed.

DESCRIPTION OF REFERENCE NUMERALS

1. Porous glass preform
2. Muffle tube
3. Heater
4. Heat-insulating material
5. Water-cooling chamber
6. Hearting furnace
7. Atmospheric gas introduction port
8. Pressure measurement nozzle
9. Elevating device
10. Shaft
12. Atmospheric gas exhaust tube
13. Atmospheric gas exhaust pump
14. Buffering gas introduction tube
15. Buffering chamber
16. First gas seal
17. Second gas seal
18. Buffering chamber exhaust tube
19. Buffering gas retention vessel
20. Main exhaust tube
21. Main exhaust pump
22. Detoxifying equipment
23. External air chamber
24. External air chamber exhaust tube
25. Atmosphere suction port
26. Buffering gas outlet tube
27. Gap
28. Convection prevention member

The invention claimed is:

1. An apparatus for sintering a glass preform for an optical fiber, the glass preform for the optical fiber being received in a muffle tube and being heated in an atmospheric gas while being suspended on a shaft and supported thereon, comprising:
    a first gas seal that is provided at an upper end of the muffle tube, the shaft being inserted therethrough;
    a buffering chamber that is provided above the first gas seal and that covers the shaft;
    a second gas seal that is provided at an upper end of the buffering chamber, the shaft being inserted therethrough;
    an external air chamber adjacent to the buffering chamber and separated from the buffering chamber by the second gas seal; and
    a unit that introduces the atmospheric gas exhausted from the muffle tube into the buffering chamber,
    wherein the external air chamber comprises an atmosphere suction port that is provided to the external air chamber, and the external air chamber is always ventilated with external air.

2. The apparatus for sintering a glass preform for an optical fiber according to claim 1, further comprising:
    an atmospheric gas exhaust pump that exhausted the atmospheric gas from the muffle tube,
    wherein the atmospheric gas exhausted by the atmospheric gas exhaust pump is introduced into the buffering chamber.

3. The apparatus for sintering a glass preform for an optical fiber according to claim 1,
    wherein the external air chamber is provided above the second gas seal and covers the shaft.

4. The apparatus for sintering a glass preform for an optical fiber according to claim 1, further comprising:
    a buffering chamber internal pressure adjustment unit that causes an internal pressure of the buffering chamber to be approximately equal to an external air pressure.

5. The apparatus for sintering a glass preform for an optical fiber according to claim 4, wherein
    the buffering chamber internal pressure adjustment unit includes:
    a buffering chamber exhaust tube that is provided to the buffering chamber;
    a main exhaust tube that is connected to the buffering chamber exhaust tube; and
    an external air suction port that is provided between the buffering exhaust tube and the main exhaust tube.

6. The apparatus for sintering a glass preform for an optical fiber according to claim 5, further comprising a buffering gas retention vessel between the buffering chamber exhaust tube and the external air suction port.

7. The apparatus for sintering a glass preform for an optical fiber according to claim 1, further comprising a convection prevention member, in the vicinity of a lower end of the shaft, that narrows down a gap between an outer circumference of the shaft and an inner circumference of the muffle tube.

8. The apparatus for sintering a glass preform for an optical fiber according to claim 1, wherein the first gas seal and the second gas seal respectively have a laminated structure of a felt-like sheet and a gas-tight sheet.

9. The apparatus for sintering a glass preform for an optical fiber according to claim 8, wherein the felt-like sheet is a carbon felt sheet.

10. The apparatus for sintering a glass preform for an optical fiber according to claim 8, wherein the gas-tight sheet is a fluorine resin sheet.

11. A method for sintering a glass preform for an optical fiber, the glass preform for the optical fiber being received in a muffle tube and being heated in an atmospheric gas while being suspended on a shaft and supported thereon, the method comprising the steps of:

providing a first gas seal having the shaft inserted therethrough at an upper face of the muffle tube;

providing a buffering chamber above the first gas seal so as to cover the shaft;

providing a second gas seal having the shaft inserted therethrough at an upper face of the buffering chamber;

providing an external air chamber adjacent to the buffering chamber and separated from the buffering chamber by the second gas seal; and performing heating while introducing the atmospheric gas exhausted from the muffle tube into the buffering chamber, wherein the external air chamber corn irises an atmosphere suction sort that is provided to the external air chamber, and the external air chamber is always ventilated with external air.

12. The method for sintering a glass preform for an optical fiber according to claim 11:

wherein the external air chamber is provided above the second gas seal so as to cover the shaft.

13. The method for sintering a glass preform for an optical fiber according to claim 11, further comprising the step of:

causing an internal pressure of the buffering chamber to be approximately equal to an external air pressure.

14. The method for sintering a glass preform for an optical fiber according to claim 11, further comprising the step of:

adjusting an hourly average value of the internal pressure in the muffle tube to be within ±200 Pa with respect to the external air pressure.

* * * * *